US012792056B2

(12) United States Patent
Perreault et al.

(10) Patent No.: US 12,792,056 B2
(45) Date of Patent: Nov. 10, 2026

(54) REAL-TIME PATH PLANNING AND TRAFFIC MANAGEMENT FOR AN INDEPENDENT CART SYSTEM

(71) Applicant: Rockwell Automation Technologies, Inc., Mayfield Heights, OH (US)

(72) Inventors: Brian M. Perreault, Stow, MA (US); Daniel I. Lanier, North Billerica, MA (US); Yuhong Huang, Acton, MA (US); Michael D. Cook, Mequon, WI (US); Michaela R. Kaufmann, Chelmsford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 149 days.

(21) Appl. No.: 18/617,291

(22) Filed: Mar. 26, 2024

(65) Prior Publication Data

US 2025/0306600 A1 Oct. 2, 2025

(51) Int. Cl.
*G05D 1/644* (2024.01)
*B65G 54/02* (2006.01)
(Continued)

(52) U.S. Cl.
CPC ....... *G05D 1/644* (2024.01); *G05B 19/41895* (2013.01); *G05D 1/69* (2024.01);
(Continued)

(58) Field of Classification Search
CPC .......... G05D 1/644; G05D 1/69; G05D 1/693; G05D 1/6987; G05D 2105/28;
(Continued)

(56) References Cited

U.S. PATENT DOCUMENTS 11,628,556 B2 * 4/2023 Balasubramanian .... B65G 1/04 700/245
11,829,158 B2 11/2023 Huang et al.
(Continued)

FOREIGN PATENT DOCUMENTS

EP 3931655 B1 * 2/2023 ......... G01C 21/3446
WO WO-2018183571 A1 * 10/2018 ......... G06K 7/10297

OTHER PUBLICATIONS

EP-3931655-B1 Baldini original and machine translation (Year: 2023).*

*Primary Examiner* — Kito R Robinson
*Assistant Examiner* — Zachary E. F. Glade
(74) *Attorney, Agent, or Firm* — Boyle Fredrickson, S.C.

(57) ABSTRACT

A method for real-time path planning in an independent cart system includes generating a first route for a mover to travel from among multiple paths in the independent cart system and transmitting the first route to a segment controller. The mover is controlled along a portion of the track segments in the first route, and a first weighting value is determined for a remainder of the first route as the mover is travelling along the first route. At least one additional route for them mover is generated as the mover is travelling along the first route, and a second weighting value is assigned to the additional route. The weighting values for the remainder of the first route and for the additional route are compared to determine whether the mover will continue along the first route or transition to the different route.

20 Claims, 11 Drawing Sheets

(51) Int. Cl.

| | |
|---|---|
| ***G05B 19/418*** | (2006.01) |
| ***G05D 1/69*** | (2024.01) |
| ***G05D 1/693*** | (2024.01) |
| ***G05D 1/698*** | (2024.01) |
| ***G05D 105/28*** | (2024.01) |
| ***G05D 107/70*** | (2024.01) |
| ***G05D 109/10*** | (2024.01) |
| ***H02K 41/03*** | (2006.01) |

(52) U.S. Cl.
CPC ........... *G05D 1/693* (2024.01); *G05D 1/6987* (2024.01); *B65G 54/02* (2013.01); *G05D 2105/28* (2024.01); *G05D 2107/70* (2024.01); *G05D 2109/14* (2024.01); *H02K 41/031* (2013.01)

(58) Field of Classification Search
CPC ........... G05D 2107/70; G05D 2109/14; G05B 19/41895; B65G 54/02; H02K 41/031
See application file for complete search history.

(56) References Cited

U.S. PATENT DOCUMENTS

| | | | | |
|---|---|---|---|---|
| 2019/0393813 | A1* | 12/2019 | Huang | H02P 7/025 |
| 2022/0097969 | A1 | 3/2022 | Brady et al. | |
| 2022/0315333 | A1 | 10/2022 | Lert, Jr. et al. | |
| 2022/0342423 | A1* | 10/2022 | Kono | B65G 43/00 |
| 2023/0347949 | A1 | 11/2023 | Huang | |
| 2024/0059327 | A1 | 2/2024 | Huang et al. | |

* cited by examiner 430 435 425

| PARAMETER | DATA |
|---|---|
| ROUTE | ————— |
| PAYLOAD | ————— |
| ORDER | ————— |
| WEIGHT | ————— |
| | |
| | |
| VELOCITY | ————— |

REAL-TIME PATH PLANNING AND TRAFFIC MANAGEMENT FOR AN INDEPENDENT CART SYSTEM

BACKGROUND INFORMATION

The subject matter disclosed herein relates to a system and method for adapting routes for an independent cart system in real time. More specifically, conditions along a first route are monitored as a vehicle travels along the first route, and when conditions along a second route provide a better route than the first route, the vehicle transitions to the second route.

As is known to those skilled in the art, motion control systems utilizing independent cart technology employ a linear drive system embedded within a track and multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track.

Historically, independent cart systems were configured to provide a single, closed path over which vehicles would travel. The vehicles would receive a payload at a first location along the path. Additional actions would be performed to the payload or further payload added as the vehicle traveled between the first location and a second location along the path. At the second location, the payload would be removed, and the vehicle would return to the first location via a return route.

However, applications in which independent cart systems are deployed have evolved. New applications include, for example, fulfillment centers or inventory management between a manufacturing facility and a warehouse. Track layouts include multiple paths, an increasing number of vehicles, and varying payloads that may need to be conveyed by the independent cart system. The independent cart system may receive a request for product to be transported between a first location and a second location. When the request is received, a vehicle is identified to transport the product and a route for the vehicle is determined. As the vehicle travels along the route, however, other vehicles in the system are similarly commanded to travel between two locations. As the multiple vehicles travel through the independent cart system, multiple vehicles may be commanded to travel along a common track segment causing congestion on that track segment. Alternately, one vehicle may be commanded to stop at a location along a track which is in the route of another vehicle. Congestion or stopped vehicles along a route increase the travel time of other vehicles and reduce the efficiency of the independent cart system.

Thus, it would be desirable to provide a system and method for planning routes of vehicles in real-time for an independent cart system.

BRIEF DESCRIPTION

According to one embodiment of the invention, a method for real-time path planning in an independent cart system is disclosed. The independent cart system includes a track having multiple paths and multiple track segments connected together to define the multiple paths, where each of the track segments includes a segment controller. The method includes generating a first route for a mover to travel along the paths in the independent cart system in a first controller for the independent cart system and transmitting the first route to a first segment controller in the independent cart system. Operation of the mover is controlled along a portion of the track segments in the first route with the corresponding segment controller for each track segment. A first weighting value is determined for a remainder of the first route as the mover is travelling along the first route, and at least one additional route is generated for the mover to travel along the paths in the independent cart system in the first controller as the mover is travelling along the first route. A second weighting value is assigned to each of the additional routes. When the first weighting value is less than the second weighting value for each additional route, operation of the mover continues along the remainder of the first route. When the first weighting value is greater than the second weighting value for a different route, operation of the mover continues along the different route.

According to another embodiment of the invention, a system for real-time path planning in an independent cart system includes a track having multiple track segments, where the track segments are connected together to define multiple paths along the track. Each of the track segments includes a segment controller, and multiple movers are loaded on the track and configured to travel along the track. A fleet controller is configured to maintain a record of a present location for each of the movers, generate a first route for a first mover to travel along the paths, assign a first weighting value to the first route, and transmit the first route to a first segment controller, where the first mover is located on the track segment corresponding to the first segment controller. The fleet controller recalculates the first weighting value for a remainder of the first route, generates at least one additional route for the mover to travel along the paths, and assigns a second weighting value to the at least one additional route. When the first weighting value is less than the second weighting value for each of the additional routes, the fleet controller commands the first mover along the remainder of the first route. When the first weighting value is greater than the second weighting value for a different route, the fleet controller commands the mover along the different route.

According to yet another embodiment of the invention, a method for real-time traffic management in an independent cart system is disclosed. The independent cart system includes a track having multiple paths and multiple track segments connected together to define the paths. The method includes receiving a commanded task for a mover at a fleet controller for the independent cart system. The commanded task identifies a desired destination and at least one item of payload to be loaded on the mover. A vehicle worksheet for the mover is generated as a function of the task, and the vehicle worksheet includes the commanded task and a first route for the mover to travel along the paths. The vehicle worksheet is transmitted from the fleet controller to a first segment controller in the independent cart system. The first segment controller corresponds to a track segment on which the mover is located. Operation of the mover is controlled with the first segment controller as a function of the first vehicle worksheet. The vehicle worksheet is successively transmitted to another segment controller corresponding to each of the track segments along which the mover travels as the mover travels along the first route. Operation of the mover is dynamically adapted as the mover travels along the first route as a function of data in the vehicle worksheet.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
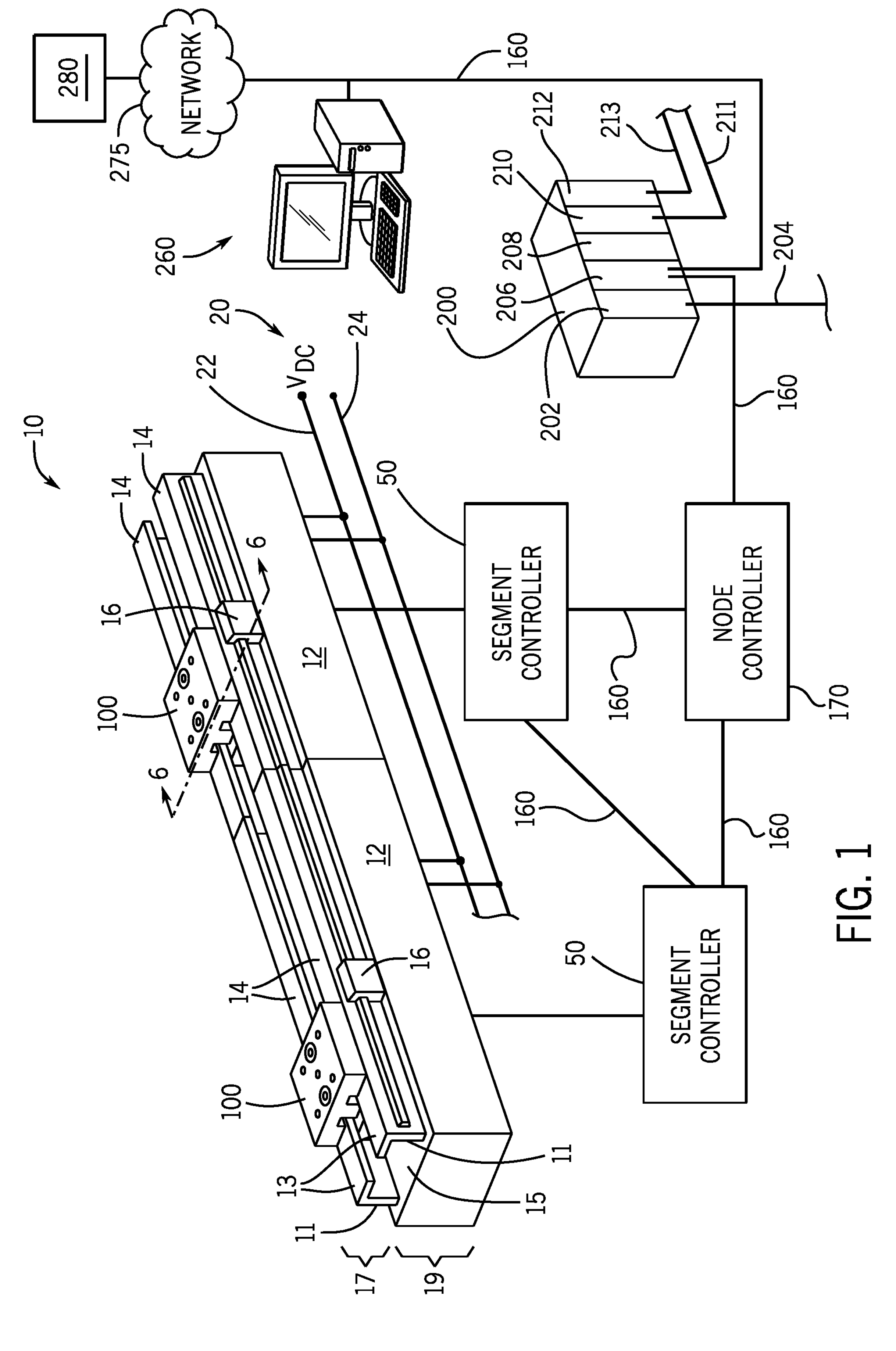
FIG. 1 is a schematic representation of an exemplary control system for an independent cart system according to one embodiment of the invention.
Figure 2:
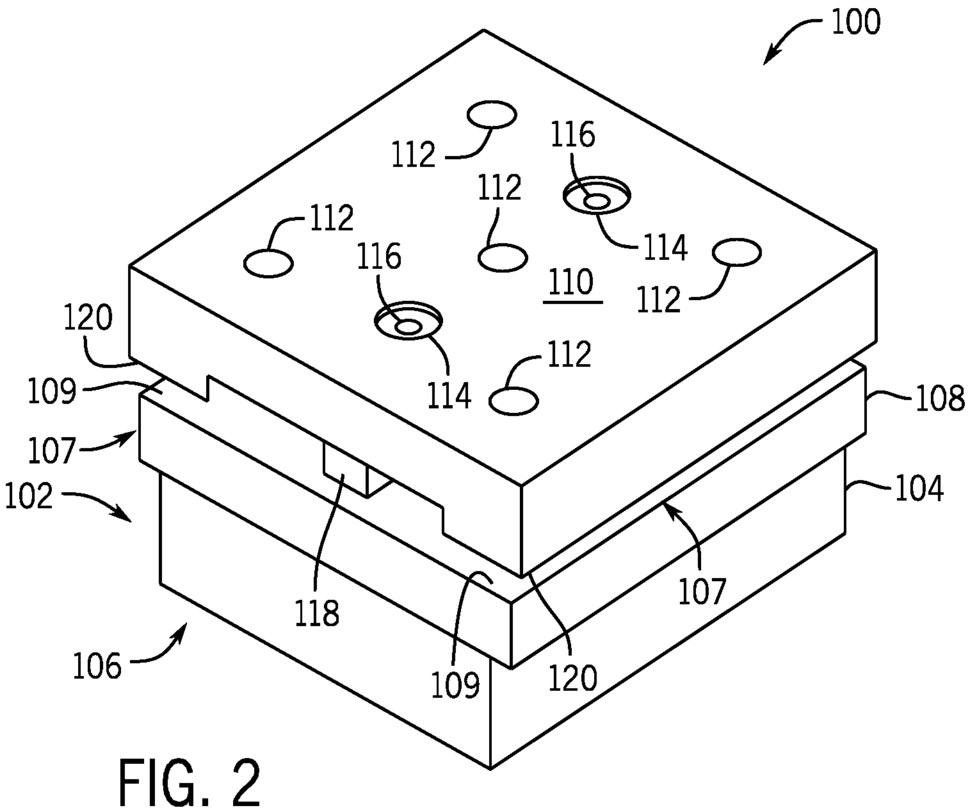
FIG. 2 is a perspective view of one embodiment of a mover configured to travel along the track of FIG. 1.
Figure 3:
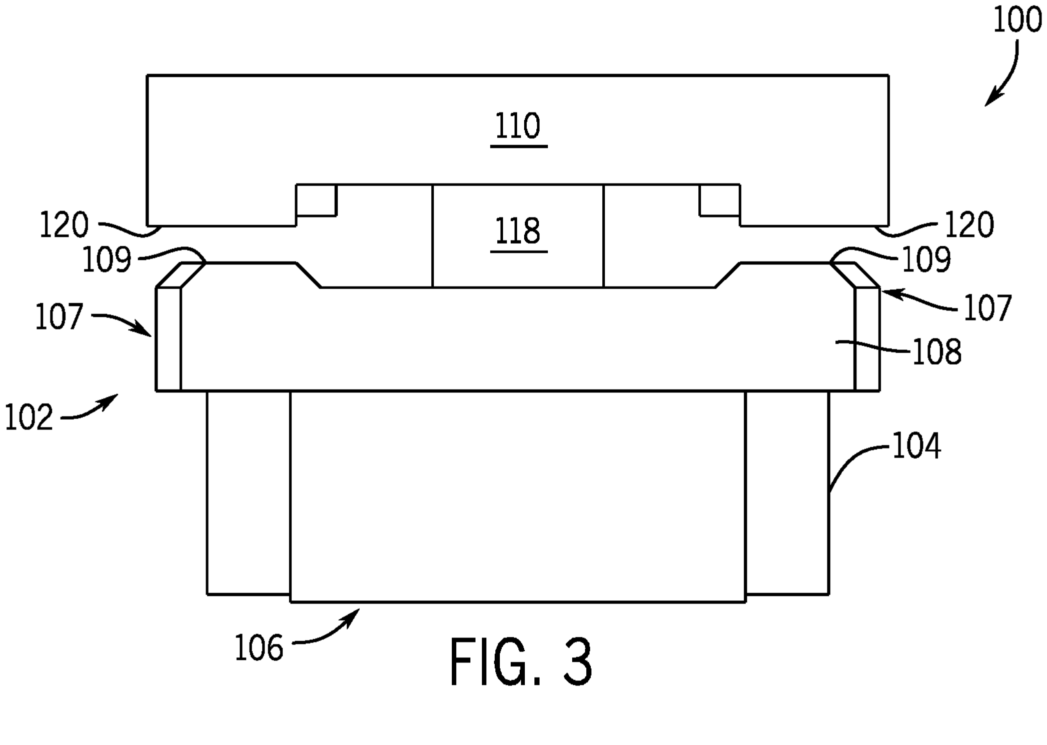
FIG. 3 is a front elevational view of the mover of FIG. 2.
Figure 4:
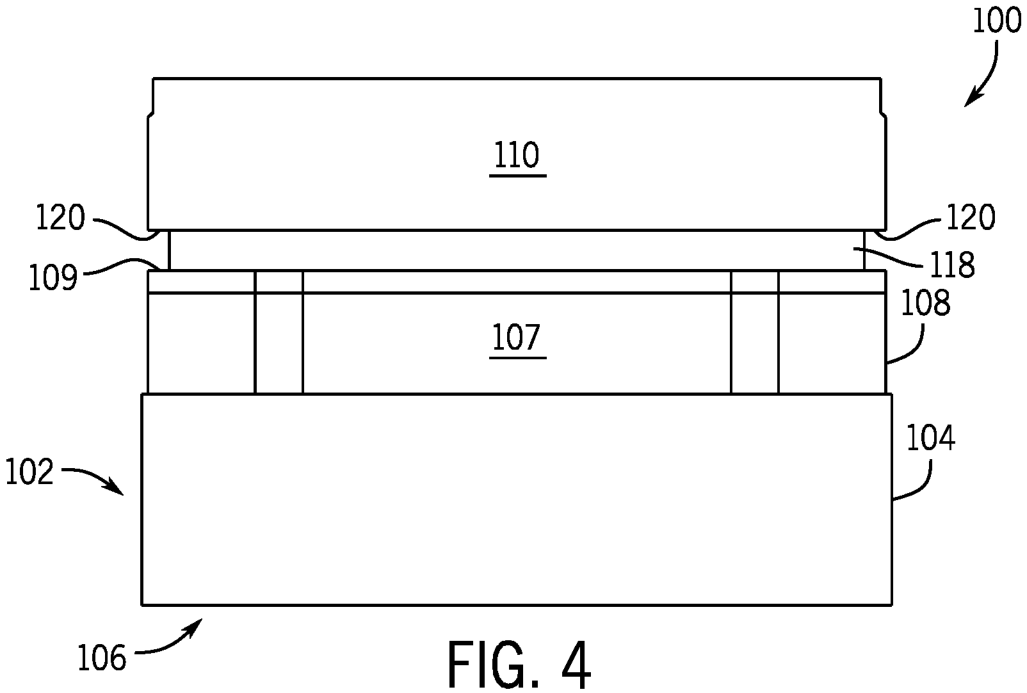
FIG. 4 is a side elevational view of the mover of FIG. 2.
Figure 5:
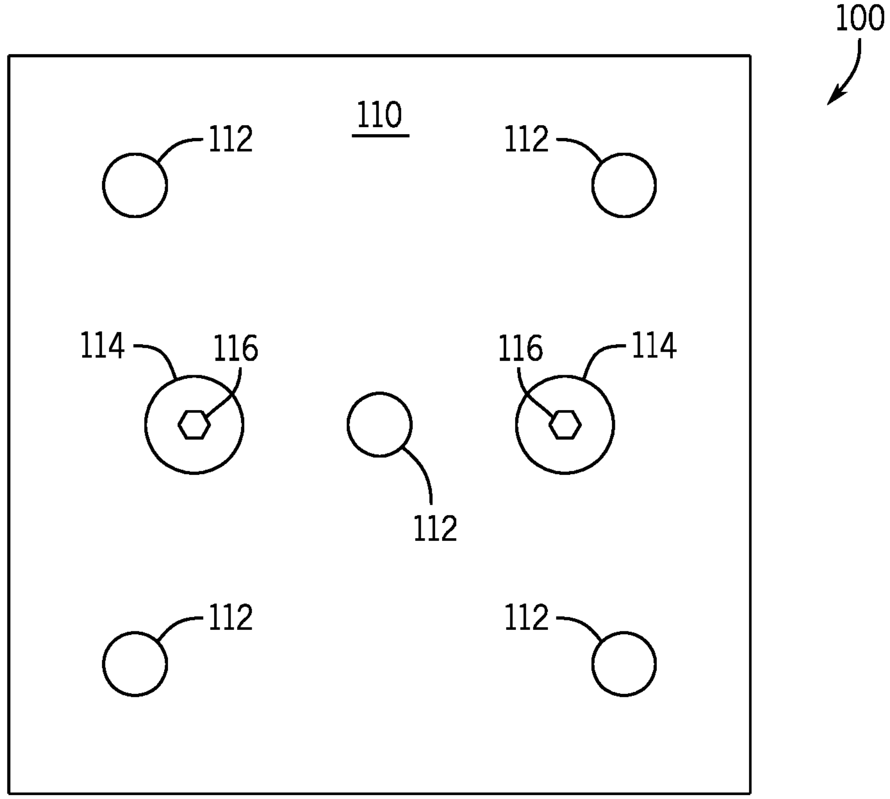
FIG. 5 is a top plan view of the mover of FIG. 2.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word “connected,” “attached,” or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for planning routes of vehicles in real-time for an independent cart system. A fleet controller is responsible for issuing motion commands for movers in the independent cart system. The fleet controller may be a dedicated controller to issue motion commands for movers, monitor locations of movers, and monitor operating conditions along the track. Optionally, a programmable controller, responsible for at least a portion of the control of the independent cart system or of a device external to the independent cart system may serve as the fleet controller. When a mover is required to move from a first location to a second location within the independent cart system, the fleet controller analyzes the current conditions of the independent cart system and identifies a first route along which the mover will travel.

As the mover is travelling along the first route, the fleet controller continually monitors conditions of the independent cart system. According to one aspect of the invention, the fleet controller assigns weighting values to different track segments. The weighting value may be determined as a function of various conditions including, but not limited to, an amount of traffic present on the track segment, a length of travel along the track segment, a distance from the mover, or other traffic scheduled to travel along the track segment. The fleet controller may continually identify alternate routes along which the mover may travel to reach its desired destination based on its present location along the first route and determine weighting values for the alternate routes. If the weighing value of an alternate route indicates the alternate route is a better route than the remainder of the first route, the fleet controller issues a new move command to the mover such that the mover begins following the alternate route.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. According to one aspect of the invention, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Turning next to FIGS. 2-5, one embodiment of the mover 100 is configured to slide along the channel 15 as it is propelled by a linear drive system. The mover 100 includes a body 102 configured to fit within the channel 15. The body 102 includes a lower portion 104, configured to hold magnets 130 (see also FIG. 6), and an upper portion 108, configured to engage the rails 14. The lower portion has a lower surface 106 to slide along the bottom surface of the channel 15. The upper portion 108 includes side contacting surfaces 107 which slide along an interior surface of the side segments 11 of the rails 14 and upper contacting surfaces 109 which slide along an interior surface of the top segments 13 of the rails 14. The mover 100 also includes a platform 110 mounted to the body 102 of the mover. An upper surface of the platform 110 includes multiple threaded openings 112 to which a fixture, or workpiece, may be mounted. Various workpieces, clips, fixtures, and the like may be mounted on the top of each platform 110 for engagement with a product to be carried along the track by the mover 100 according to an application's requirements. The platform 110 also includes a pair of openings 114 through which a threaded fastener 116 such as a bolt may be used to secure the platform 110 to the body 102 of the mover 100. A central guide portion 118 of the platform 110 extends downward toward the body 102 of the mover 100. The central guide portion 118 has a width less than the gap between the two rails 14 and fits within the gap between rails when the mover 100 is mounted on the track. The central guide portion 118 also extends further than lower contacting surfaces 120 on the platform 110 creating a gap between the upper contacting surfaces 109 of the body 102 and the lower contacting surfaces 120 of the platform 110 equal to the width of the top segment 13 of the rails 14 such that the lower contacting surfaces 120 of the platform 110 slide along an exterior surface of the top segments 13 of the rails. According to the illustrated embodiment, the platform 110 is generally square and has a sectional area similar to the sectional area of the body 102 as viewed from the top of the mover 100. It is contemplated that platforms 110, or attachments, of various shapes may be secured to the body 102.

Figure 6:
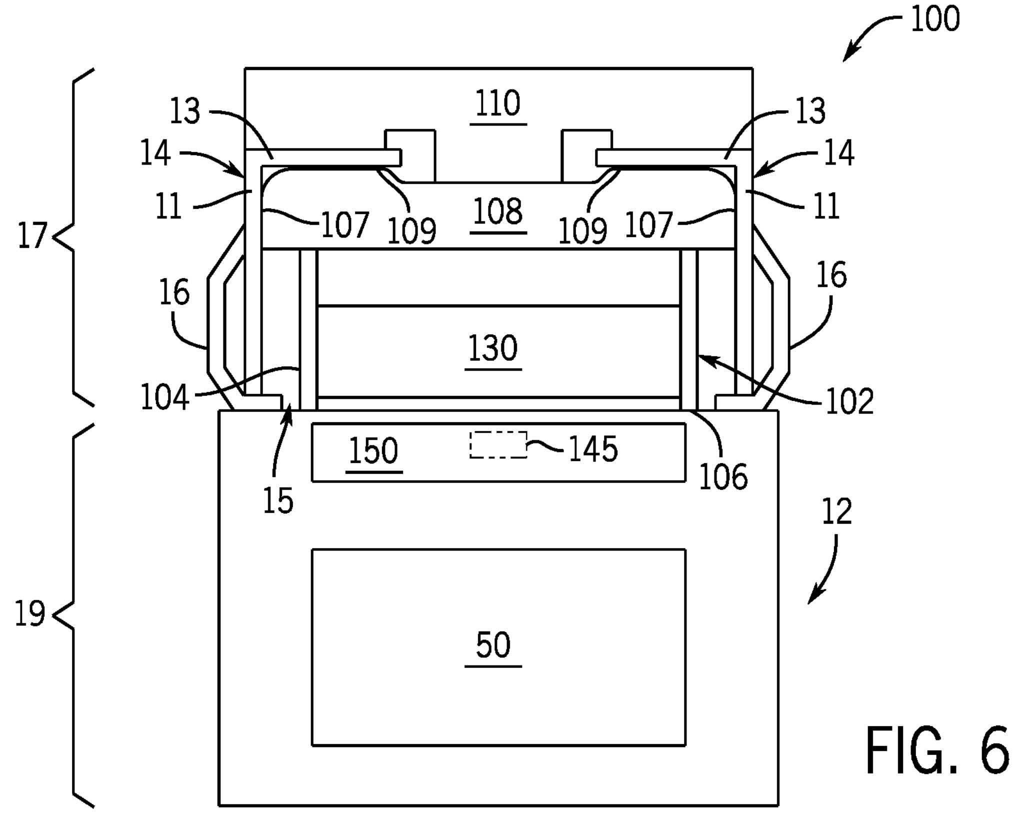
FIG. 6 is a sectional view of one embodiment of a mover and track segment included in the linear drive system taken at 6-6 of FIG. 1.
Figure 7:
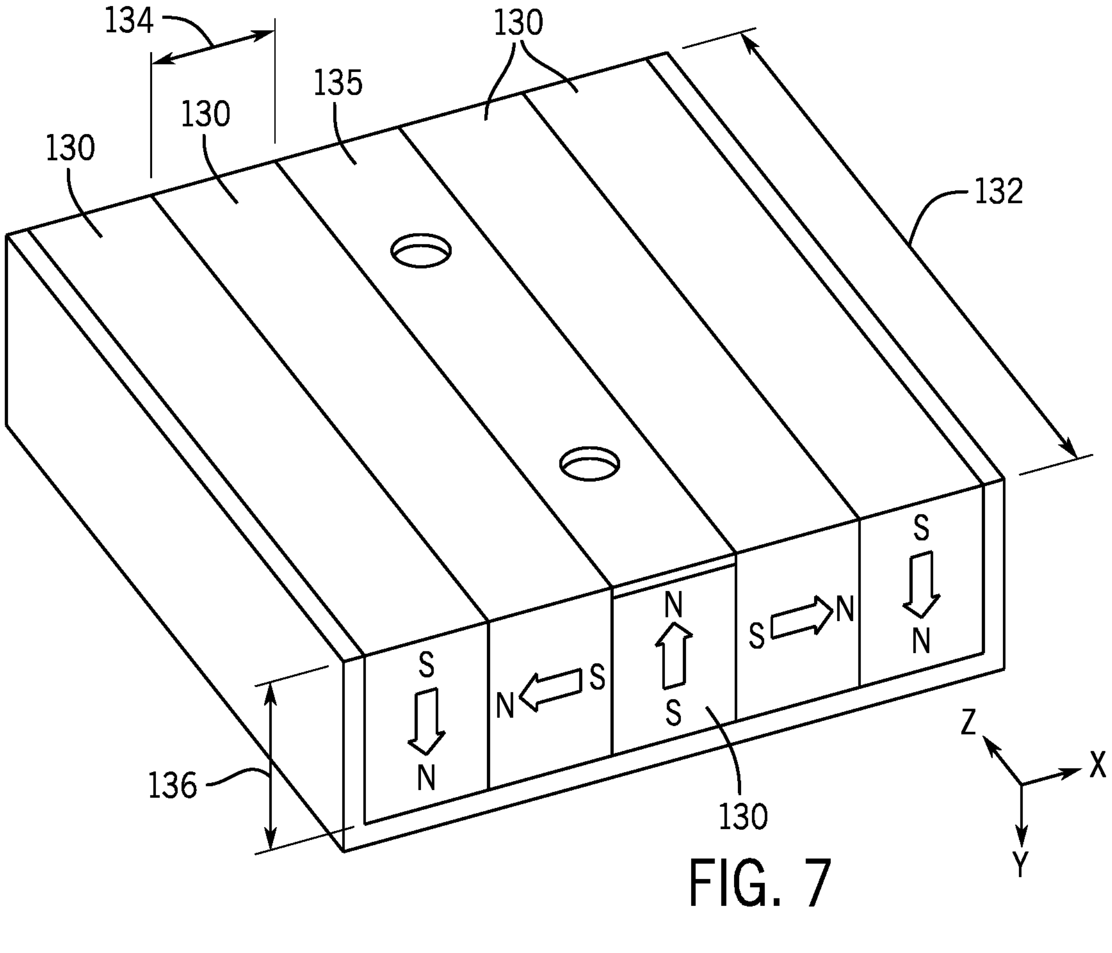
FIG. 7 is a perspective view of one embodiment of a magnet array used within the mover of FIG. 6.

The mover 100 is carried along the track 10 by a linear drive system. The linear drive system is incorporated in part on each mover 100 and in part within each track segment 12. One or more drive magnets 130 are mounted to each mover 100. With reference to FIG. 6, the drive magnets 130 are arranged in a block on the lower surface of each mover. With reference also to FIG. 7, the illustrated embodiment includes five drive magnets 130 placed adjacent to each other in a Halbach array to define the block of magnets. Each magnet 130 has a length 132 extending in the z-axis, a width 134 extending in the x-axis, and a height 136 extending in the y-axis. From left-to-right in FIG. 7, a first drive magnet 130 has a north pole oriented along a y-axis toward the track when the mover 100 is mounted on the track. A second drive magnet 130 has a north pole oriented along an x-axis, and a third drive magnet 130 has a north pole oriented along the y-axis away from the track. A fourth drive magnet 130 has a north pole oriented along the x-axis in a direction opposite the second magnet, and a fifth drive magnet 130 has the north pole again oriented toward the track along the y-axis. As also illustrated, an orientation of the magnetic field is illustrated by the arrow pointing from the south pole toward the north pole. For movers 100 having a greater length, this rotation of the orientation for the drive magnets 130 may continue along the length of the mover 100. The Halbach array configuration has an advantage of cancelling magnetic flux tending to extend upward into the rest of the mover 100 while increasing the magnetic flux tending to extend downward toward the track for interaction with the linear drive system. The illustrated embodiment for the arrangement of drive magnets 130 is not intended to be limiting. Various other configurations of the drive magnets 130 may be utilized as non-illustrated embodiments of the invention.

Figure 8:
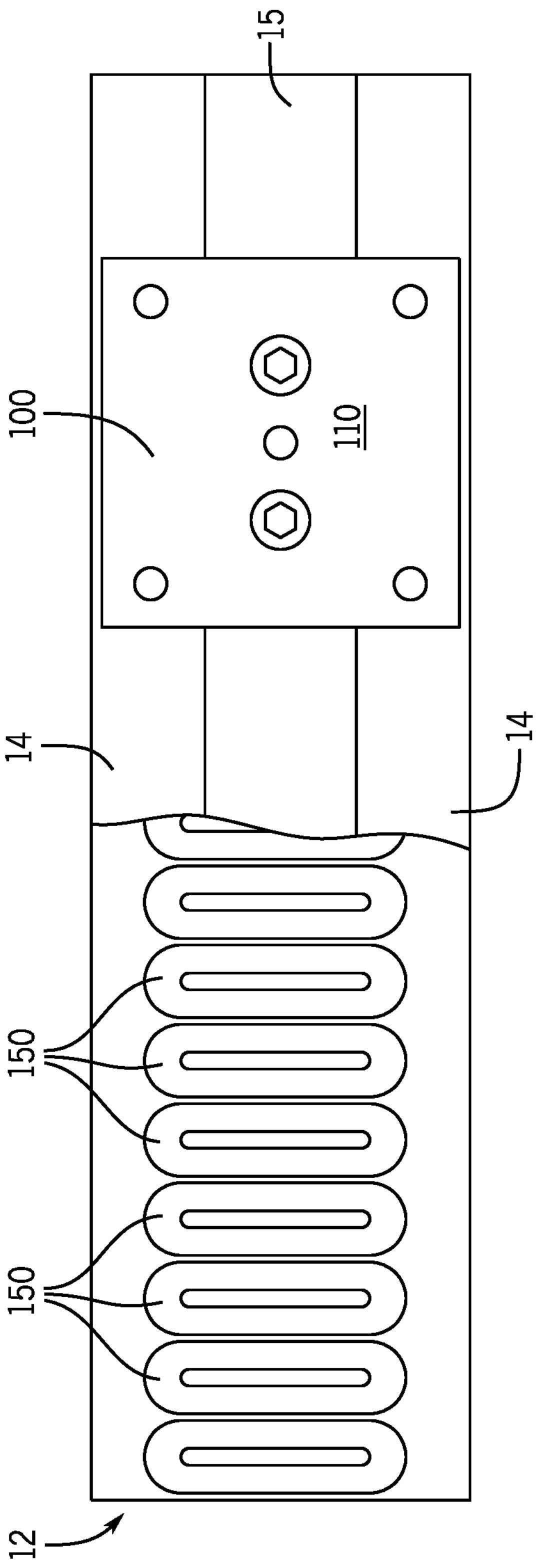
FIG. 8 is a partial top cutaway view of the mover and track segment of FIG. 1.

The linear drive system further includes a series of coils 150 spaced along the length of the track segment 12. With reference also to FIG. 8, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 6, it is contemplated that each segment controller 50 may be mounted in the lower portion 19 of the track segment 12. Each segment controller 50 is in communication with a node controller 170 which is, in turn, in communication with an industrial controller 200. The industrial controller may be, for example, a programmable logic controller (PLC)

configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

As further illustrated in FIG. 1, the independent cart system may include a local, edge controller 260, a remote application executing and hosted in a data processing center 280, or a combination thereof. The edge controller 260 is connected to the industrial controller 200 via the network medium 160. If a remote application is being used, the edge controller 260 and/or the industrial controller 200 is connected to the data processing center 280 via a suitable network 275. The network 275 may include a local intranet, the Internet, or a combination thereof. The network 275 may be wired or wireless, including Wi-Fi or cellular communications over a single channel or multiple channels.

Figure 9:
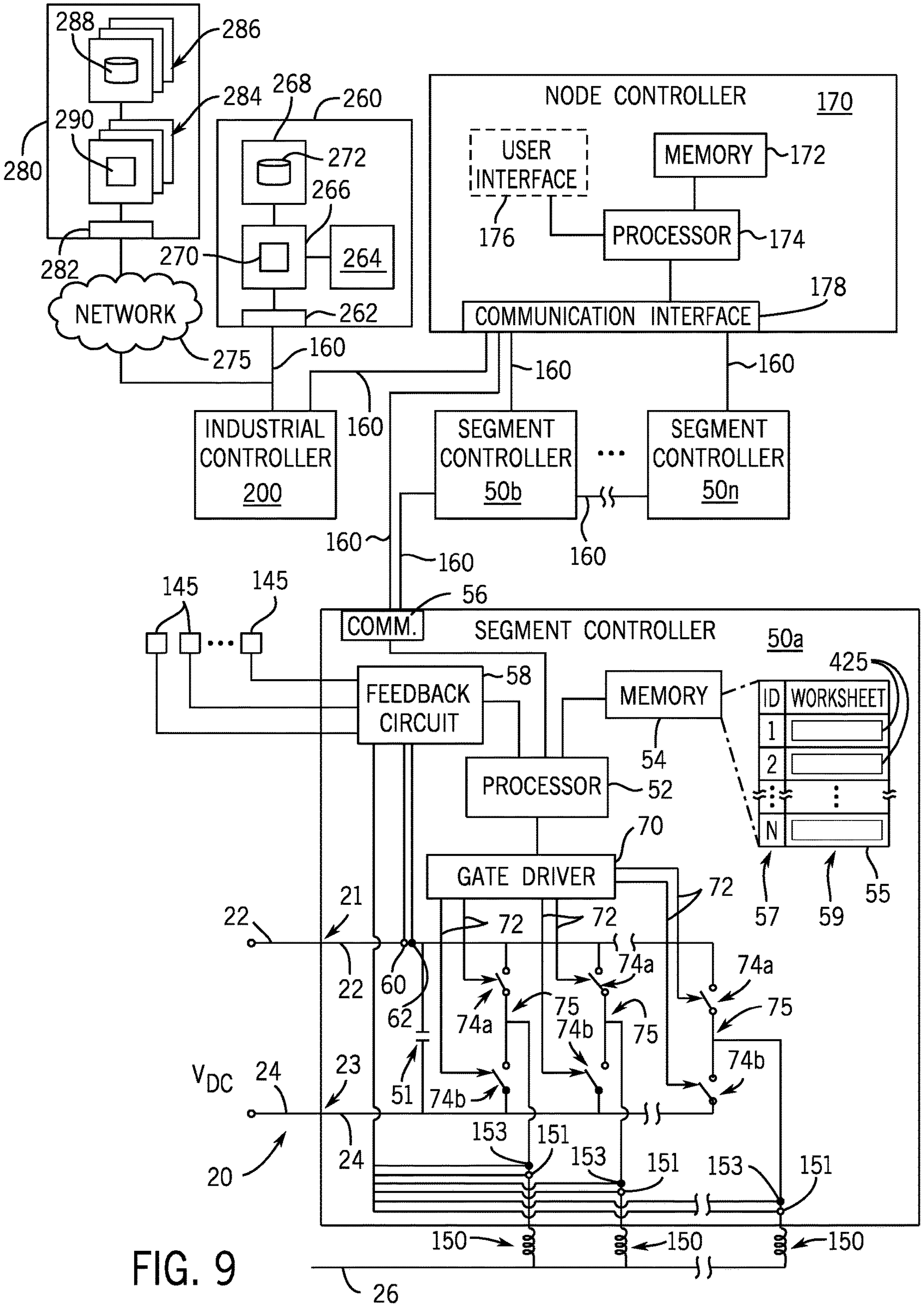
FIG. 9 is a block diagram representation of the exemplary control system of FIG. 1.

With reference also to FIG. 9, the edge controller 260 includes a communication interface 262 to connect to the network medium 160. The communication interface 262 is configured to transmit and receive data packets between the network and a processor 266 present in the edge controller 260. The edge controller 260 includes the processor 266 and memory 268. It is contemplated that the processor 266 and memory 268 may each be a single electronic device or formed from multiple devices. The processor 266 may be a microprocessor. Optionally, the processor 266 and/or at least a portion of the memory 268 may be integrated on a field programmable gate array (FPGA) or an application specific integrated circuit (ASIC). The memory 268 may include volatile memory, non-volatile memory, or a combination thereof. The memory 268 may further include fixed or removable storage medium, such as a magnetic or solid-state hard disk drive, a fixed or removable memory card, an optical drive, or a combination thereof. An optional user interface 264 may be provided for an operator to interface with the edge controller 260. The user interface 264 may include a monitor, keyboard, mouse, trackball, touch pad, touch screen, or any other suitable device to receive input from or display data to a user. Optionally, the edge controller 260 may be accessed via the network 275 from a remote device.

The edge controller 260 is configured to execute one or more applications 270 on the processor. The edge controller 260 may execute independently or in combination with the data processing center 280. The edge controller 260 may serve as a fleet controller for the independent cart system or be in communication with another controller serving as a dedicated fleet controller. The edge controller 260 may also execute a machine learning model corresponding to the independent cart system and to the operating conditions along the track for the independent cart system. The memory 268 is configured to store a database 272 including rules for the machine learning model, a history of reference and/or feedback signals from the independent cart system, and data regarding routes travelled within the independent cart system including, but not limited to, a history of routes travelled, a time of day routes are travelled, and a length of time a mover takes to traverse a route. The machine learning model uses the historical data from the feedback signals and/or rules stored within the database 272 to identify trends or other conditions in the traffic flow for the independent cart system. The edge controller 260 may use the identified trends to generate a first route for a mover 100. As a mover 100 is commanded to travel along the track 10, the edge controller 260 may monitor feedback signals and/or trends in traffic to continually identify a preferred route of travel for the mover 100.

Similarly, a data processing center 280 includes a communication interface 282. The communication interface 282 provides access to the network 275 and transmits data packets between the data processing center 280 and the industrial controller 200 or the edge controller 260. Although illustrated as a single data processing center, the data processing center may be distributed among multiple facilities providing Infrastructure as a Service (IaaS) or Platform as a Service (PaaS), where the IaaS or PaaS host the application executing thereon as Software as a Service (SaaS). The data processing center 280 further includes multiple processing units 284 and multiple storage units 286. One or more of the processing units 284 is configured to execute applications 290 such as the machine learning model. The applications 290 are in communication with the storage units 286 to store data to and read data from one or more databases 288 stored on one or more storage units 286.

With reference also to FIG. 9, the node controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the node controller 170 and to load or configure desired motion profiles for the movers 100 on the node controller 170. Optionally, the configuration may be performed via a remote device connected via a network and a communication interface 178 to the node controller 170. It is contemplated that the node controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the node controller 170 and user interface may be an industrial computer mounted within a control cabinet and configured to withstand harsh operating environments. It is contemplated that still other combinations of computing devices and peripherals as would be understood in the art may be utilized or incorporated into the node controller 170 and user interface 176 without deviating from the scope of the invention.

The node controller 170 includes one or more programs stored in the memory device 172 for execution by the processor 174. The node controller 170 receives a desired position for a mover from the industrial controller 200 and determines one or more motion profiles for the movers 100 to follow along the track 10. A program executing on the processor 174 is in communication with each segment controller 50 on each track segment via a network medium 160. The node controller 170 may transfer a desired motion profile to each segment controller 50. Optionally, the node controller 170 may be configured to transfer the information from the industrial controller 200 identifying one or more desired movers 100 to be positioned at or moved along the track segment 12, and the segment controller 50 may determine the appropriate motion profile for each mover 100. Various features of the present application will be discussed herein as being executed within the segment controller 50, the industrial controller 200, and the node controller 170. As illustrated in FIGS. 1 and 9, these controllers are interconnected by the network medium 160. According to other, non-illustrated embodiments of the invention, various features discussed herein as implemented on one of the controllers 50, 200, 170 may be implemented on another controller with communication via the network medium 160 transmitting data required to perform the functions between the various controllers.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, illustrated in FIG. 6, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal which is offset from each other by ninety electrical degrees (90°). Multiple position sensors 145 are, therefore, generating feedback signals in tandem for a single mover 100 as the mover is travelling along the track 10. The feedback signals from each position sensor 145 are provided to a feedback circuit 58 which, in turn, provides a signal to the processor 52 corresponding to the magnet 130 passing the sensor 145.

The segment controller 50 also includes a communication interface 56 that receives communications from the node controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. With reference again to FIG. 1, a DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential. According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the embodiment illustrated in FIG. 9, three legs are shown. However, the number of legs may vary and will correspond to the number of coils 150 extending along the track segment 12. Each leg includes a first switching device 74*a* and a second switching device 74*b* connected in series between the positive rail 22 and the negative rail 24 with a common connection 75 between the first and second switching devices 74*a*, 74*b*. The first switching device 74*a* in each leg may also be referred to herein as an upper switch, and the second switching device 74*b* in each leg may also be referred to herein as a lower switch. The terms upper and lower are relational only with respect to the schematic representation and are not intended to denote any particular physical relationship between the first and second switching devices 74*a*, 74*b*. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 130 on each mover 100 to control motion of the movers 100 along the track segment 12.

Figure 10:
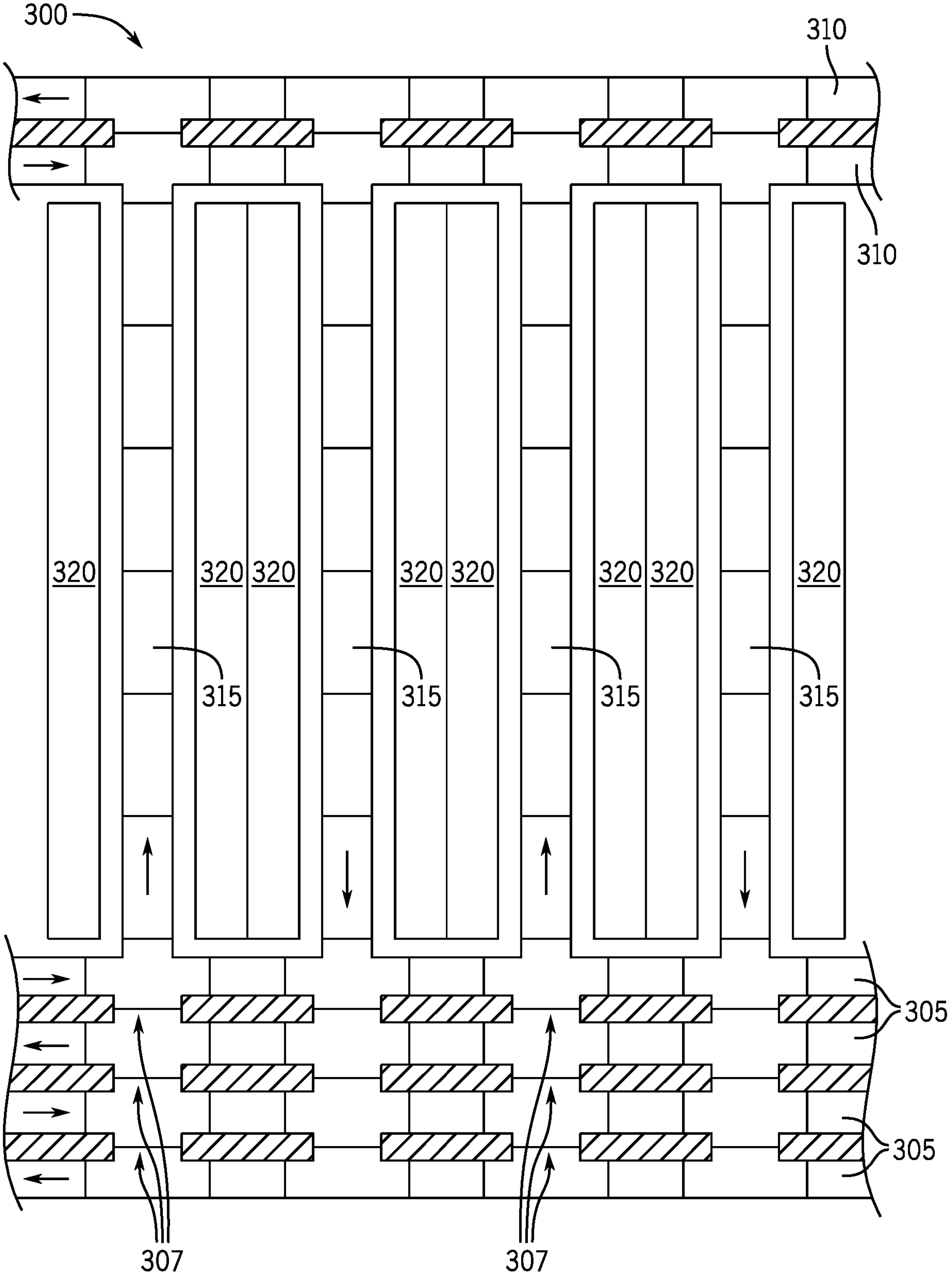
FIG. 10 is a top plan view of a portion of a fulfillment center incorporating an independent cart system.

In one exemplary application, an independent cart system can be incorporated into a fulfillment center. This application is not intended to be limiting. However, for case of discussion, aspects of the present invention will be discussed with respect to implementation in a fulfillment center. Turning next to FIG. 10, a portion of an exemplary fulfillment center 300 incorporating an independent cart system is illustrated. The illustrated fulfillment center 300 includes four main paths 305 on which movers 100 may travel. The four main paths 305 are located along the bottom of the drawing. Similarly, the illustrated fulfillment center 300 includes two return paths 310 on which movers 100 may travel. The two return paths 310 are located along the top of the drawing. As illustrated, it is contemplated that each main path 305 and each return path 310 carries one-way traffic under normal operation, where the direction of traffic is indicated by the arrows on the figure. Junctions 307 are provided at periodic intervals along each of the four main paths 305, where a mover 100 may transition from one of the main paths 305 to an adjacent main path or even to another main path spaced multiple tracks apart. In the illustrated embodiment, the junctions 307 align with aisles 315 of the fulfillment center 300.

Figure 11:
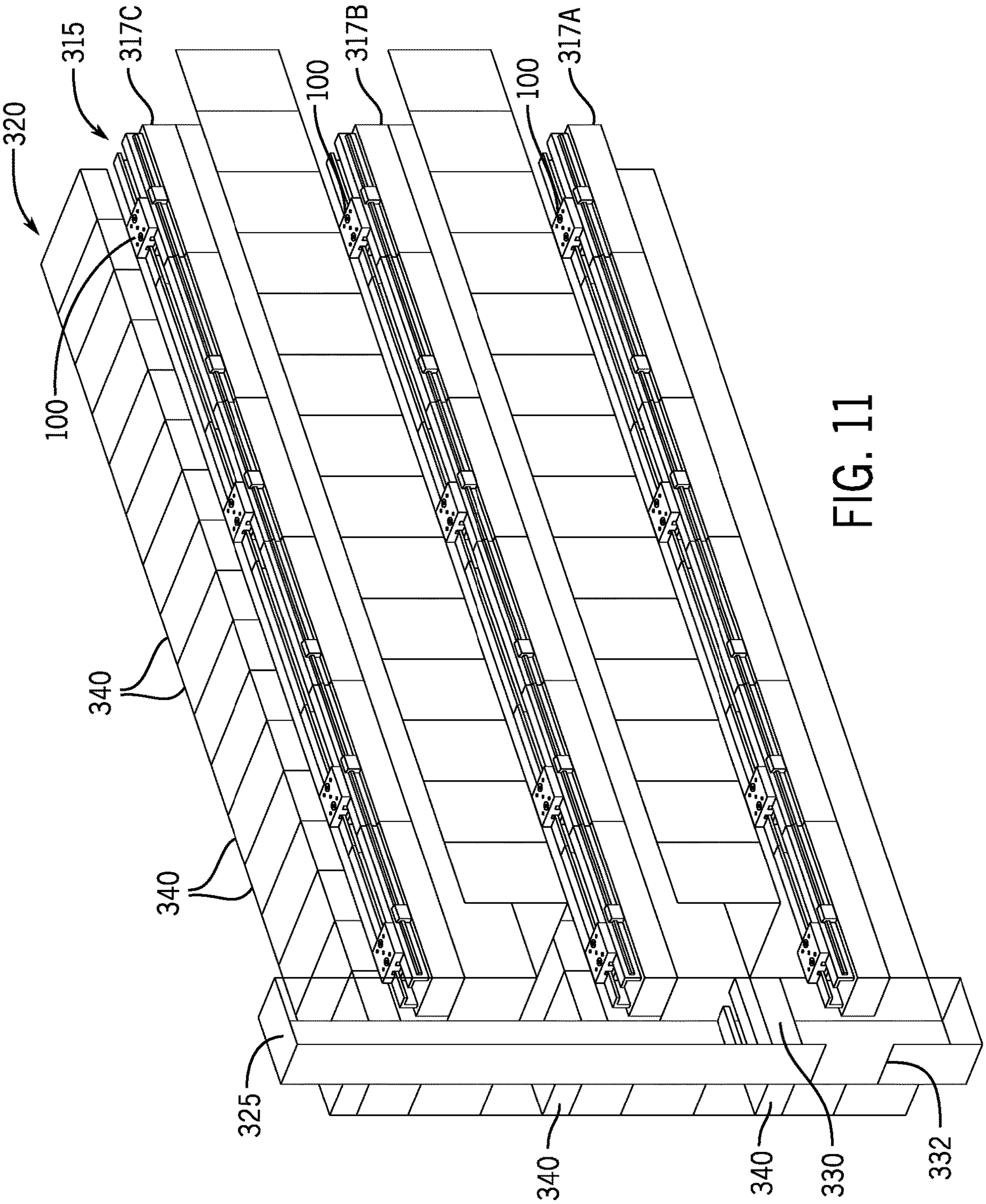
FIG. 11 is a partial perspective view of a vertical rack system incorporating an independent cart system.

Each aisle 315 includes a track extending along the length of the aisle between the main paths 305 and the return paths 310. On each side of the aisle 315 is a storage system 320, containing payload to be loaded onto the mover 100 as the mover travels along the aisle 315. With reference also to FIG. 11, the storage system 320 may have multiple tiers. The illustrated storage system 320 has three tiers. A first aisle track 317A runs along the floor. A second aisle track 317B extends along the length of the second tier, and a third aisle track 317C extends along the length of the third tier. A lift 325 is shown at one end of the storage system 320. The lift 325 includes a lift member 330 which travels vertically between the first, second, and third aisle tracks 317A, 317B, 317C. A mover 100 travels onto the lift 325 at an entrance 332 to the lift. One of the tracks on the main path 305 or on the return path 310 or a transition 307 from the main path or return path to the aisle 315 may be positioned on the front side of the entrance 332. When the lift member 330 is positioned adjacent to the first aisle track 317A, a mover 100 may transition between the main path 305, the return path 310, or the transition 307 and the lift member 330. The mover 100 may then continue along the first aisle track 317A or be raised up to the second or third aisle track 317B, 317C. A second lift 325 may be positioned at the opposite end of the aisle 315 to transition movers 100 between levels. According to another embodiment of the invention, additional tracks may span between aisles 315 at the second or third tiers, where lifts 325 are stationed at various positions throughout the fulfillment center 300 to raise or lower movers 100 between tiers as needed.

Movers 100 travel along the tracks to receive items from the fulfillment center. A mover 100 may be ordered to retrieve a single item or multiple items. Each tier of the storage system 320 includes multiple bins 340 spaced along the length of the aisle 315, and the bins 340 include varying payload to be carried by a mover 100. As a mover 100 travels along an aisle, the bin may include an actuator to push, tip, carry, or otherwise convey product from the bin 340 to the mover 100. Optionally, robotic arms may be interspersed between bins 340 to pick payload from the bins 340 and place the payload onto the movers 100. A mover 100 may come to a stop by a bin 340 to receive the payload or payload may be delivered onto a mover 100 as the mover 100 travels past the location of the bin 340 within the fulfillment center.

The illustrated fulfillment center 300 is not intended to be limiting. It is understood that various numbers of paths 305, 310 and aisles 315 may exist. Further, the paths 305, 310 and aisles 315 may support one-way travel, bidirectional travel, or a combination thereof. The aisles 315 may have just one or two levels of storage bins 340 placed along the length or include more than three tiers.

In operation, traffic management and planning of routes for movers 100 to travel within the fulfillment center 300 is performed in real-time. As will be discussed in more detail below, a mover 100 is initially commanded to travel along a first route to receive a desired payload. The desired payload may include multiple items and require the mover 100 to travel past multiple bins 340 within the fulfillment center 300. A fleet controller may identify a preferred route of travel for the mover 100 based on the operating conditions of the fulfillment center 300 at the time an order is received. However, operating conditions may change as the mover 100 travels throughout the fulfillment center 300 and alternate routes may provide improved throughput and a reduced completion time for fulfilling the order. The fleet controller, therefore, adapts the route of the mover 100 based on the revised operating conditions to travel along the alternate route rather than requiring the mover 100 to complete the initial commanded route.

Figure 12:
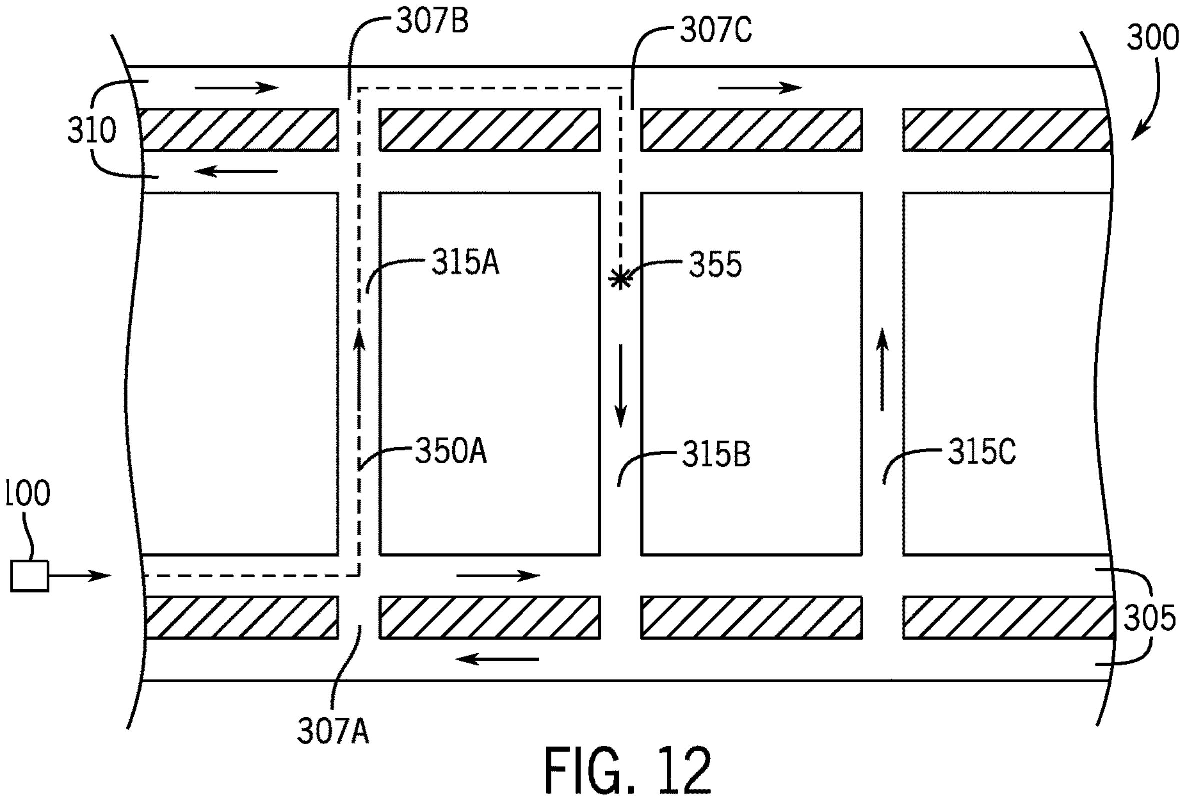
FIG. 12 is a top plan view for a portion of another independent cart system illustrating a first route for a mover to travel to reach a desired location.
Figure 13:
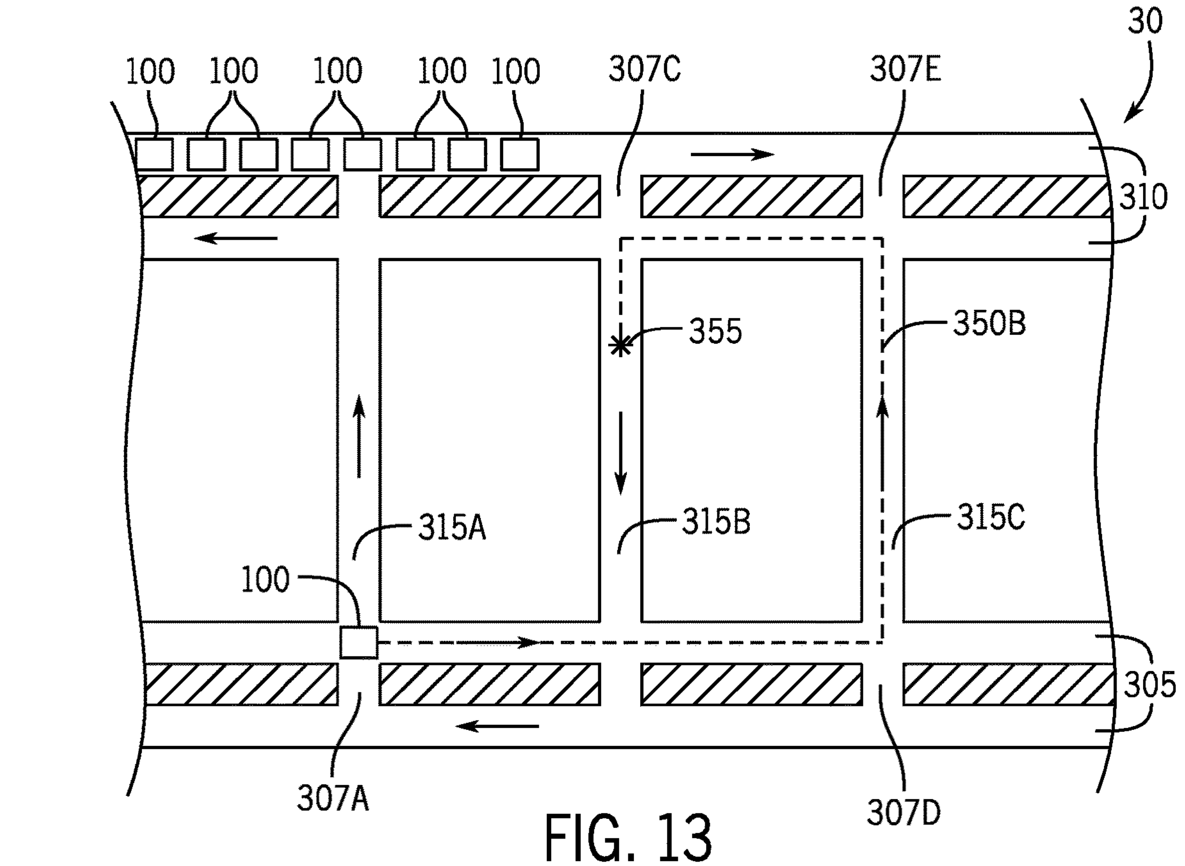
FIG. 13 is a top plan view for the portion of the independent cart system of FIG. 12 illustrating a second route for the mover to reach the desired location.

With reference next to FIGS. 12 and 13, an exemplary instance of a mover 100 switching routes is illustrated. In each figure, a reduced portion of the fulfillment center 300 is illustrated. A command is received for the fulfillment center 300 to retrieve product located at a desired destination 355. A mover 100 located at a remote location within the fulfillment center is selected to retrieve the product. Based on the present conditions within the fulfillment center 300 a first route 350A is determined for the mover 100 to travel to reach the desired destination 355. The first route 350A has the mover 100 travelling along a main path 305 to a first junction 307A. In view of the various one-way traffic designations within the fulfillment center 300, the mover 100 then travels along the first aisle 315 to a second junction 307B located between return paths 310 at the top of the figure. The first route 350A continues through a third junction 307C and down the second aisle 315B to the desired destination 355. As mentioned, however, the mover 100 is initially located in a remote location, illustrated outside of the portion of illustrated portion of the fulfillment center. One or more queueing locations may exist within the fulfillment center at which movers 100 are located to receive commands to retrieve product from the fulfillment center. Optionally, an empty mover 100 which recently delivered payload from a prior command may be located at a drop-off location and be awaiting a new command. In either example, the mover 100 may require some amount of time to reach the illustrated portion of the fulfillment center 300.

Turning next to FIG. 13, the mover 100 has arrived at the first junction 307A identified in the first route 350A. As also illustrated in FIG. 13, by the time the mover 100 reaches the first junction 307A a platoon of movers 100 is travelling along the return route 310 on which the first mover 100 was originally scheduled to travel. The platoon of movers 100 may be a series of movers carrying payload. Optionally, the platoon may include a number of movers being relocated within the fulfillment center 300 for future usage. The number of movers 100 within the platoon, however, will delay arrival of the first mover 100 at its desired destination 355. As a result, the fleet controller determines a second route 350B by which the mover 100 may reach its desired destination. The second route 350B moves from the first junction 307A to a fourth junction 307D and along a third aisle 315C to a fifth junction 307E. From this fifth junction 307E, the mover 100 may again travel to the third junction 307C, previously identified in the first route 350A, and down the second aisle 315B to the desired destination 355. By monitoring alternate routes for the mover 100 to travel, the fleet controller is able to direct the mover 100 to arrive at the desired destination 355 more quickly using the second route 350B than if the mover 100 were required to continue along the first route 350A for the entire move.

Figures 14, 15:
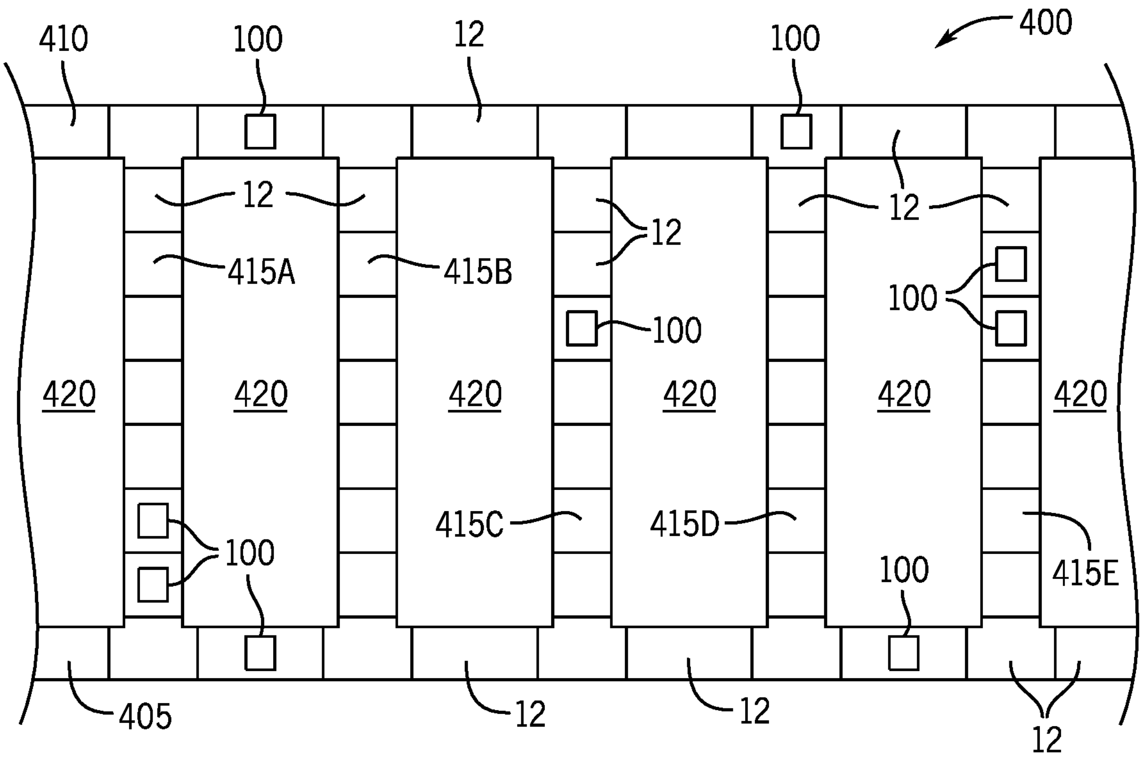
FIG. 14 is a top plan view for a portion of still another independent cart system.
FIG. 15 is a representation of one embodiment of a mover worksheet to be transmitted between segment controllers as a mover travels within the independent cart system.

With reference next to FIG. 14, a portion of another exemplary fulfillment center 400 is illustrated. In contrast to the prior illustrated fulfillment center 300, each track in the illustrated fulfillment center 400 of FIG. 14 contemplates bi-directional motion along the track segments. A first main track 405 extends along one end of storage systems 420, and a second main track 410 extends along the other end of the storage systems 420. Multiple aisles 415A-415E extend between the first main track 405 and the second main track 410. Although the fleet controller may primarily command motion along each of the first and second main tracks 405, 410 in one direction, a mover 100 may travel in an opposite direction along either track when there is no other traffic scheduled along the route. Similarly, traffic in each aisle may be primarily configured in one direction. However, when there is no other traffic scheduled along a portion of the aisle, a mover 100 may travel in the opposite direction. Bi-directional traffic flow may be particularly useful for transitioning between adjacent aisles 415 using either the first or second main tracks 405, 410. Similarly, bi-directional traffic flow may permit a mover 100 to retrieve items in different orders along an aisle 415 where the mover 100 may determine, for example, that a first, heavy item may need to be retrieved at a location further along an aisle before a second, lighter item at an earlier location in the same aisle. Rather than traversing around the storage system 420 to return to the earlier location, a mover 100 may be commanded to reverse direction within the aisle 415.

According to one aspect of the invention, the fleet controller may utilize a weighting system to determine both the first route and alternate routes along which a mover 100 is to travel. The weighting system assigns a value to each path along which a mover 100 is to travel. As previously discussed, a track 10 includes multiple track segments 12. A unique weighting value may be assigned to each track segment 12. For purposes of discussion, an exemplary weighting system will be discussed where low values designate a preferred path along which the mover 100 is to travel. The fleet controller may identify each potential route along which the mover 100 may travel to reach a desired destination and sum the weighting value for each track segment 12 along the route. The route with the lowest value is determined to be the preferred route. It is understood that an equivalent weighting system may designate high values as a preferred path along which the mover 100 is to travel. Under such a system, the route with the highest value would determine the preferred route.

Multiple factors may be used to define weighting values for each track segment 12. A first factor for determining the weighting value may be the distance a track segment 12 is away from the mover 100. Further, the distance may be determined as a physical distance, for example, based on an external coordinate system used to map the independent cart system. Alternately, the physical distance may be determined as a function of the length of track the mover 100 must travel to reach the track segment 12. As an example, a simple track configuration may be a single loop in which movers 100 travel in single direction around the loop. A track segment 12 from which a mover 100 has just traversed is immediately prior to the mover 100 physically but would require the mover to traverse the entire length of the track before returning. Two very different weighting values would be determined based on physical distance or the distance the mover 100 must travel to return to the track segment 12. Track segments 12 which can be reached more quickly are given weighting values indicating they are preferred routes to improve throughput in the system.

A second factor for determining the weighting value may be physical operating limitations along the track segment. The operating limitations include, for example, a maximum velocity or a maximum acceleration at which a mover may travel along the track segment 12. Certain track segments 12 may have maximum velocity and acceleration set to the maximum capacity for the independent cart system. These track segments 12 are sometimes referred to as high throughput zones or main traffic zones. The sections of track may have limited access and be intended to transfer movers 100 across greater distances at the rated capacity for the system. Other track segments 12 may have maximum velocity and acceleration set to values less than the maximum capacity for the independent cart system. These track segments 12 may, for example, pass by a station at which action is required on a payload, be curved, or otherwise have a need for reduced speed. In a fulfillment center, the aisles 415 may have lower maximum velocity values, expecting movers 100 to be stopping along the aisle. The reduced speed is provided such that subsequent movers 100 do not need to stop as rapidly if another mover stops along the aisle to receive a product. Track segments with higher maximum velocity and acceleration are assigned weighting values indicating they are preferred routes to increase throughput in the system.

A third, related factor for determining the weighting value may be an expected level of traffic along a portion of the track. The expected level of traffic may be based on trends observed by the machine learning system. Higher levels of traffic may require slower speeds and/or more frequency stopping due to actions taken on other movers 100 in the traffic. The level of traffic may also be monitored based on present commands in the independent cart system. As an increasing number of movers 100 are commanded to travel within the system, the routes assigned to each mover 100 may be analyzed to determine where the movers 100 will be travelling. A track segment 12 which initially had low traffic and a preferred weighting value, may see an increase in expected traffic as movers 100 are commanded to travel along the track segment. The weighting value for the tracks segment 12 may change to a less preferred weighting value, indicating an expected influx of traffic along the route.

The factors discussed herein are intended to be exemplary and not limiting. It is understood that various other factors may influence a weighting value for a particular track segment 12. Further, the factors discussed above may vary as a function of the time of day or of the payload present on the mover. Further, the machine learning system may detect trends along various portions of the track. The weighting values for different track segments 12 may change dynamically as the payload is loaded/unloaded, as a function of the time of day, or of the trend detected. As will be discussed in more detail below, the dynamic weighting value for the route is monitored as the mover travels along the route to verify that the initial route is still the preferred route for the mover to reach a destination.

With reference next to FIGS. 9 and 15, each mover 100 may have a vehicle worksheet 425 assigned to the mover 100. The vehicle worksheets 425 include multiple parameters 430 and the data 435 associated with each parameter. According to the illustrated embodiment, the vehicle worksheet 425 stores the route information for the mover 100. Each vehicle worksheet 425 also includes a parameter 430 identifying payload to be received by the mover 100. The parameter may include either a single or multiple items of payload. For multiple payload items, the order in which the items are to be loaded onto the mover 100 may also be stored as well as the weight of each item. Still other data such as whether an item is fragile, perishable, and the like may be included as parameters. A single velocity value for the mover 100 may be stored, indicating a maximum velocity at which the mover may travel along the route. Alternately, multiple velocity values may be stored, where each velocity corresponds to an item of payload. The mover 100 may be limited in speed when a heavy item, a fragile item, a liquid item prone to spillage, or the like is loaded onto the mover 100.

The vehicle worksheet 425 is associated with each mover 100 and is stored on the segment controller 50 responsible for controlling operation of the mover 100. The segment controller 50 may include a table 55 of vehicle worksheets 425, where the table includes a mover identification 57 and a column 59 of worksheets 425. In some applications, multiple movers 100 may be present on a single track segment 12 and, therefore, the segment controller 50 may need to have worksheets 425 for each mover 100. In other applications, the table 55 may pre-allocate memory such that a look up table is ready to receive a vehicle worksheet 425 for each mover 100 as the mover 100 arrives at the track segment 12. In still other applications, the segment controllers 50 for each track segment 12 along the route may receive a copy of the vehicle worksheet 425 when the route is assigned to each mover in order to permit the segment controller 50 to anticipate the arrival of each mover.

For distributed control of each mover 100, the fleet controller may generate a new vehicle worksheet 425 or populate an existing vehicle worksheet when a mover 100 is required to fulfill an order in the micro fulfillment center 400. The new vehicle worksheet 425 is transferred to the segment controller 50 on which the mover 100 is located and stored in memory 54. The existing vehicle worksheet 425, already present in memory 54, is populated with the new order. Once the vehicle worksheet 425 is generated or populated, the segment controllers 50 utilize the information in the vehicle worksheet to control the mover 100 and to fulfill the order for the micro fulfillment center. The segment controller 50 on which the mover 100 is initially located identifies a first payload to be loaded onto the mover 100 and a first location from the route to which the mover 100 must travel. The segment controller 50 begins commanding the mover 100 to travel to the first location according to any control parameters, such as maximum acceleration or maximum velocity, stored in the vehicle worksheet. As a mover 100 transitions from one track segment 12 to the next, adjacent track segment, the segment controller 50 from the track segment on which the mover 100 was previously controlled transmits the vehicle worksheet 425 to the segment controller 50 for the adjacent track segment 12 which will next be responsible for controlling the mover 100. In this manner, the vehicle worksheet 425 is sequentially transmitted to adjacent segment controllers 50 as the mover 100 travels along the track, and each subsequent segment controller 50 utilizes the information in the vehicle worksheet 425 to control operation of the mover 100.

Figure 16:
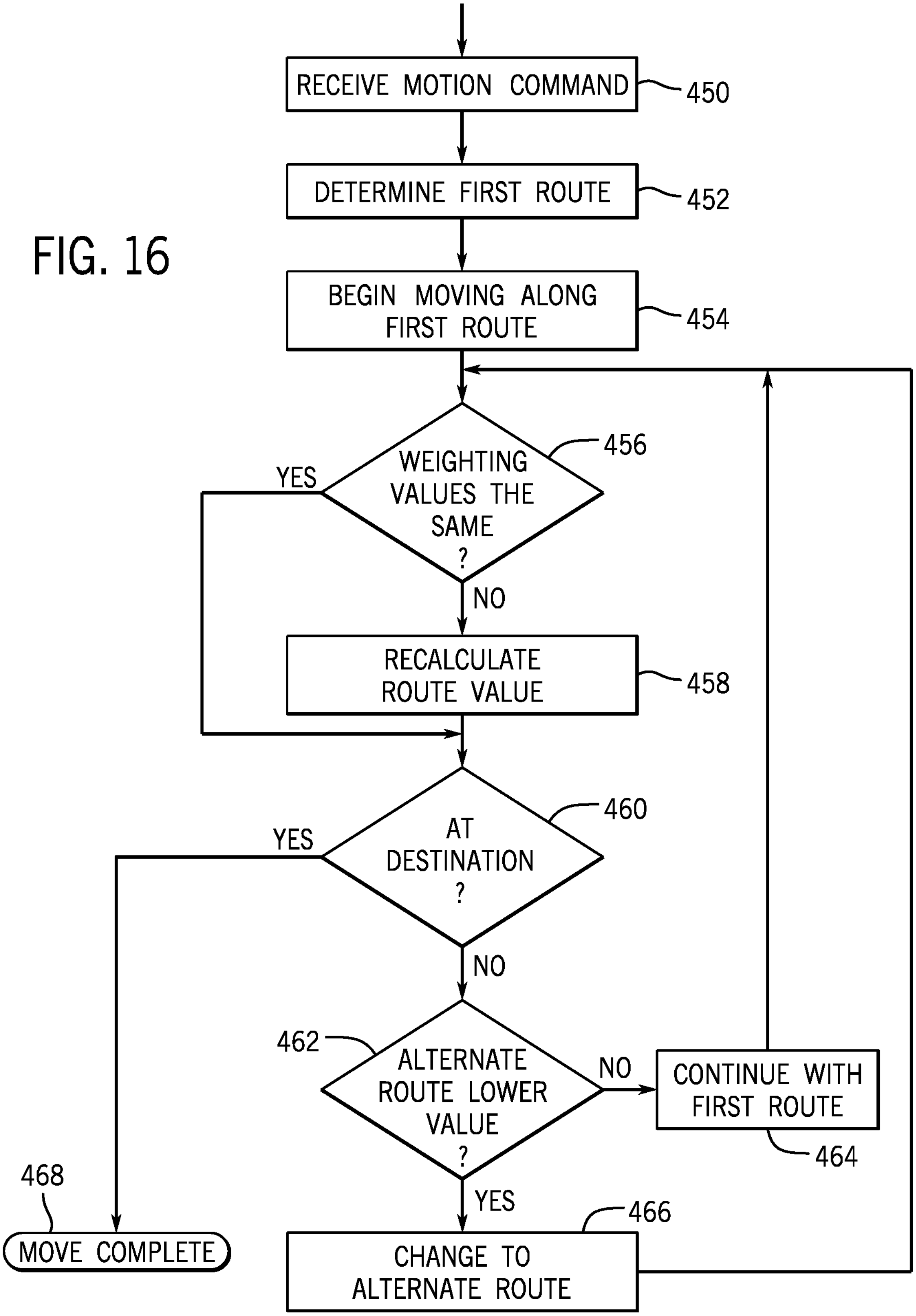
FIG. 16 is a flow diagram illustrating steps for real-time path planning in the independent cart system according to one embodiment of the invention.

Turning next to FIG. 16, steps for planning the path of a mover 100 in real-time according to one embodiment of the invention are illustrated. At step 450, a motion command for one of the movers 100 is received. According to one aspect of the invention, a fleet controller is included in the independent cart system which monitors the present location of movers 100 and issues commands for each mover 100 to travel to a new location. The motion command may be a new order requiring fulfillment from the fulfillment center 400. The fleet commander may parse the order to determine how many and what type of movers 100 are required to fulfill the order. Optionally, the motion command may be a control signal from the industrial controller 200 indicating, for example, that action taken on a payload has been completed and the mover 100 on which the payload is located needs to move to a new location. As indicated in step 452, the fleet controller determines a first route the mover 100 to travel based on the order or command signal. The first route may be determined using the weighting values discussed above to identify the fastest route for the mover 100 to travel from an initial location to a desired location. The first route is communicated to the node controller 170 and/or the segment controller 50 to begin controlling the mover 100 along the first route, as shown in step 454.

Due to the dynamic nature of the fulfillment center, the weighting value for the first route may vary as the mover 100 is travelling along the first route. As shown in step 456, a controller will monitor the weighting values for track segments 12 along the first route as the mover 100 is travelling along the first route. According to one aspect of the invention, the fleet controller may continually monitor weighting values for each track segment 12 and update the weighting value for the first route, or at least for the untraveled portion of the first route, as the mover 100 travels along the route. According to another aspect of the invention, a local controller, such as the node controller 170 or one of the segment controllers 50 may update the value for the first route. Data for the first route may be included in the vehicle worksheet 425 such as identifiers for each track segment 12 and the initial weighting values of these track segments along which the mover 100 will travel. The local controller may be in communication with other node controllers 170 or segment controllers 50 along the first route to detect changes in the weighting value for the corresponding track segment 12 while the mover 100 is travelling along the first route. Alternately, the local controller may receive updated weighting values from the fleet controller. The local controller may update the weighting value in the vehicle worksheet 425 for the first route, or at least for the untraveled portion of the first route, as the mover 100 travels along the route. The continual monitoring and updating of weighting of the first route as the mover travels the route, allows the fleet controller or the local controller to decide in real-time whether the first route remains the best route for the mover 100 to travel.

Throughout the duration of the mover 100 travelling the first route, the controller may adapt the route based on detection of a preferred weighting value. As shown at step 460, monitoring continues until the mover 100 reaches its desired destination. If the mover 100 is still travelling to the desired destination, the controller compares the updated weighting value for the remainder of the current route along which the mover 100 is travelling to alternate routes the mover 100 may travel to reach the same destination. If no alternate route has a lower, or preferred, weighting value than the present route, then the mover will continue travelling along the present route, as shown in steps 462 and 464. However, if an alternate route is identified with a lower, or preferred, weighting value than the present route, the controller switches to the alternate route and the mover 100 begins travelling along the alternate route, as shown in steps 462 and 466.

According to another aspect of the invention, the vehicle worksheets 425 may be utilized to manage tasks associated with a mover 100 throughout a command motion. The fleet controller receives a command for the independent cart system, where the command may include either a single operation or multiple operations by a mover 100. As a first example, the command may simply require a mover 100 to arrive at a desired location to receive a payload. The fleet controller determines an appropriate mover 100 for the payload at a close proximity to the desired location and generates the motion command for the mover 100. A single route with the desired location is stored in the vehicle worksheet 425 along with any desired operating characteristics for the mover 100 as it travels to the desired location. As a second example, the command may require the mover 100 to retrieve multiple items of payload from the fulfillment center 400. The fleet controller may determine a first route that travels through the fulfillment center 400 to obtain each of the multiple items of payload. The fleet controller may utilize the weighting values and/or trends determined by the machine learning as discussed above to generate the first route. Optionally, the fleet controller may store locations of each payload item within the vehicle worksheet 425 and at least one route between items. Characteristics of each payload item may be stored in the vehicle worksheet including, but not limited to, the weight of the item, the dimensions of the item, and whether the item is fragile or requires special operation by the mover 100.

The fleet controller may also determine an order for retrieving items in the worksheet 425, where the order may be determined as a function of the characteristics of each item. For example, an order may include two items. The first item may be located closest to a mover 100, reducing the weighting value for a route between the mover 100 and the first item. A second item, located further from the mover 100 may have an increased weighting value due to the number of track segments 12 over which the mover 100 must travel to reach the second item. However, the first item may be fragile and small while the second item may be heavy, large, and packaged in a solid container on which the first item could be stacked. If, however, the first item is loaded first, there may be no room on the mover 100 in order to load the second item. Thus, the first item would need to be delivered prior to picking up the second item. Thus, the overall travel required based on the characteristics of the items increases the weighting value for the first item and decreases the weighting value for the second item, causing the second item to be retrieved prior to retrieving the first item. Because both items can be retrieved and delivered to an unload station together, the overall throughput of the fulfillment center is increased.

According to another aspect of the invention, the order includes multiple items of payload. The fleet controller determines a first item to be retrieved from the fulfillment center 400 as a function of weighting values for track segments 12 and of properties of the items of payload. The fleet controller identifies a first route between the present location of the mover 100 and the first item of payload. The fleet controller may further identify at least one additional route between each of the items of payload. The first route and each additional route is stored in the vehicle worksheet 425. As the mover 100 reaches the destination for the first item, a best route to the next item of payload is determined. The segment controller 50 on which the mover 100 is located may communicate with other segment controllers 50 along the routes stored in the vehicle worksheet to determine weighting values for each additional route and determine which item of payload has the best weighting value to retrieve next. Alternately, the segment controller 50 may communicate with a central controller, such as the fleet controller to receive a current set of weighting values for each of the additional routes to determine which item to retrieve next. In this manner, operation of the mover 100 is dynamically updated by identifying the best route to one of the additional items of payload which still needs to be retrieved as each item is delivered to the mover.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for real-time path planning in an independent cart system, wherein the independent cart system includes a track having a plurality of paths and a plurality of track segments connected together to define the plurality of paths, the method comprising the steps of:

generating a first route for a mover to travel along the plurality of paths in the independent cart system in a fleet controller for the independent cart system;

transmitting the first route to a first segment controller in the independent cart system, wherein each of the plurality of track segments includes a segment controller;

controlling operation of the mover along a portion of the plurality of track segments in the first route with the corresponding segment controller for each of the plurality of track segments;

generating at least one additional route for the mover to travel along the plurality of paths in the independent cart system in the segment controller for one of the plurality of track segments on which the mover is presently located as the mover is travelling along the first route;

continually determining a first weighting value for a remainder of the first route with the segment controller for one of the plurality of track segments on which the mover is presently located in real-time as the mover is travelling along the first route;

continually determining a second weighting value for each of the at least one additional routes with the segment controller for one of the plurality of track segments on which the mover is presently located in real-time as the mover is travelling along the first route;

when the first weighting value is less than the second weighting value for each of the at least one additional routes, continue controlling operation of the mover along the remainder of the first route with the segment controller for one of the plurality of track segments on which the mover is presently located; and when the first weighting value is greater than the second weighting value for a different route, selected from the at least one additional routes, controlling operation of the mover along the different route with the segment controller for one of the plurality of track segments on which the mover is presently located.

2. The method of claim 1, wherein the mover includes a vehicle worksheet stored in the first segment controller, the method further comprising the steps of:

writing the first route to the vehicle worksheet after transmitting the first route to the first segment controller; and transmitting the vehicle worksheet to the corresponding segment controller as the mover travels along the portion of the plurality of track segments.

3. The method of claim 2, wherein:

the vehicle worksheet includes at least one payload to load on to the mover, and the segment controller or the node controller dynamically changes the first route as a function of the at least one payload.

4. The method of claim 2, further comprising the step of detecting a fault with one of the plurality of track segments in the first route with either the segment controller or the node controller, wherein the segment controller or the node controller changes the first route as a function of detecting the fault.

5. The method of claim 1, wherein:

the first route includes a plurality of track segments;

the at least one additional route includes a plurality of track segments;

each of the plurality of track segments has a weighting value;

the first weighting value is determined as a sum of the weighting values for the plurality of track segments along the remainder of the first route; and the second weighting value is determined as a sum of the weighting values for the plurality of track segments along the at least one additional route.

6. The method of claim 1, wherein the first and second weighting values are determined as a function of an expected volume of traffic along a corresponding route.

7. The method of claim 1, wherein the independent cart system includes a plurality of movers, the method further comprising the step of monitoring present commands for each of the plurality of movers in the fleet controller and wherein the first route is generated as a function of a level of present commands for each of the plurality of movers.

8. A system for real-time path planning in an independent cart system, comprising:

a track including a plurality of track segments, wherein the plurality of track segments are connected together to define a plurality of paths along the track;

a plurality of segment controllers, wherein each of the plurality of track segments includes a segment controller;

a plurality of movers loaded on the track and configured to travel along the track; and a fleet controller configured to:

maintain a record of a present location for each of the plurality of movers, generate a first route for a first mover, selected from the plurality of movers, to travel along the plurality of paths, assign a first weighting value to the first route, and transmit the first route to a first segment controller, wherein the first segment controller is located in one of the plurality of track segments on which the first mover is located, and as the first mover is travelling along the first route, the segment controller for each of the plurality of track segments on which the first mover is presently located is configured to:

continually recalculate the first weighting value in real-time for a remainder of the first route, generate at least one additional route for the mover to travel along the plurality of paths, continually determine a second weighting value for the at least one additional route as the mover travels along the first route, when the first weighting value is less than the second weighting value for each of the at least one additional routes, continue commanding the first mover along the remainder of the first route; and when the first weighting value is greater than the second weighting value for a different route, selected from the at least one additional routes, commanding the mover along the different route.

9. The system of claim 8 further comprising a plurality of vehicle worksheets, wherein:

each of the plurality of movers includes a corresponding vehicle worksheet, each of the plurality of vehicle worksheets is stored in memory for the segment controller corresponding to the track segment on which the mover is located, the first route is written to the vehicle worksheet corresponding to the first mover, and the vehicle worksheet is transmitted to the corresponding segment controller for each of the plurality of track segments as the first mover travels along the first route.

10. The system of claim 9, wherein:

the vehicle worksheet includes at least one payload to load on to the first mover, and the segment controller corresponding to the track segment on which the first mover is located dynamically changes the first route as a function of the at least one payload.

11. The system of claim 8, wherein the fleet controller is further configured to:

detect a fault with one of the plurality of track segments in the first route, and modify the first route as a function of the fault.

12. The system of claim 8, wherein:

the first route includes a plurality of track segments;

the at least one additional route includes a plurality of track segments;

each of the plurality of track segments has a weighting value;

the first weighting value is determined as a sum of the weighting values for the plurality of track segments along the remainder of the first route; and the second weighting value is determined as a sum of the weighting values for the plurality of track segments along the at least one additional route.

13. The system of claim 8, wherein the first and second weighting values are determined as a function of an expected volume of traffic along a corresponding route, a time of day, and a trend determined for the corresponding track segment.

14. The system of claim 8, wherein the fleet controller is further configured to monitor present commands for each of the plurality of movers and wherein the first route is generated as a function of a level of present commands for each of the plurality of movers.

15. A method for real-time traffic management in an independent cart system, wherein the independent cart system includes a track having a plurality of paths and a plurality of track segments connected together to define the plurality of paths, the method comprising the steps of:

receiving a commanded task for a mover at a fleet controller for the independent cart system, wherein the commanded task identifies a desired destination and at least one item of payload to be loaded on the mover;

generating a vehicle worksheet for the mover as a function of the task, wherein the vehicle worksheet includes the commanded task and a first route for the mover to travel along the plurality of paths;

transmitting the vehicle worksheet from the fleet controller to a first segment controller in the independent cart system, wherein the first segment controller corresponds to one of the plurality of track segments on which the mover is located;

controlling operation of the mover with the first segment controller as a function of the first vehicle worksheet;

successively transmitting the vehicle worksheet to another segment controller corresponding to each of the plurality of track segments along which the mover travels as the mover travels along the first route;

continually determining a first weighting value for a remainder of the first route with the first segment controller and with each of the other segment controllers in real-time as the mover is travelling along the first route;

continually determining a second weighting value for at least one additional route with the first segment controller and with each of the other segment controllers in real-time as the mover is travelling along the first route; and dynamically adapting a desired route with the first segment controller and with each of the other segment controllers corresponding to each of the plurality of track segments on which the mover is located as the mover travels along the first route as a function of the first weighting value and of the second weighting value.

16. The method of claim 15, further comprising the steps of:

determining an initial first weighting value for the first route with the fleet controller;

storing the initial weighting value in the vehicle worksheet before transmitting the vehicle worksheet to the first segment controller;

determining the second weighting value for at least one additional route for the mover to travel along the plurality of paths in the independent cart system at one of the other segment controllers;

when the first weighting value is less than the second weighting value for each of the at least one additional routes, continue controlling operation of the mover along the remainder of the first route; and when the first weighting value is greater than the second weighting value for a different route, selected from the at least one additional routes, controlling operation of the mover along the different route.

17. The method of claim 15, wherein:

the vehicle worksheet includes a plurality of items of payload, and the vehicle worksheet includes at least one route between each of the plurality of items of payload, the method further comprising the steps of:

determining when the mover receives each of the plurality of items of payload with one of the segment controllers; and determining a best route to a next item of payload, selected from the plurality of items, when one of the plurality of items is received on the mover.

18. The method of claim 15, wherein:

the vehicle worksheet includes a plurality of items of payload, the data in the vehicle worksheet includes at least one operating condition which varies as a function of each of the plurality of items of payload, and varying the at least one operating condition as each of the plurality of items of payload are loaded onto the mover.

19. The method of claim 15, wherein the commanded task includes a plurality of items of payload and the first weighting value and the second weighting value are determined as a function of the plurality of items of payload.

20. The method of claim 15, further comprising the step of detecting at least one of a change in traffic along the first route, a change in a weighting value for the first route, and a change in payload.

* * * * *